Nov. 5, 1940.                    D. P. WHELAN                    2,220,503
                                TRANSPARENT BAR
                             Filed July 27, 1938                2 Sheets-Sheet 1
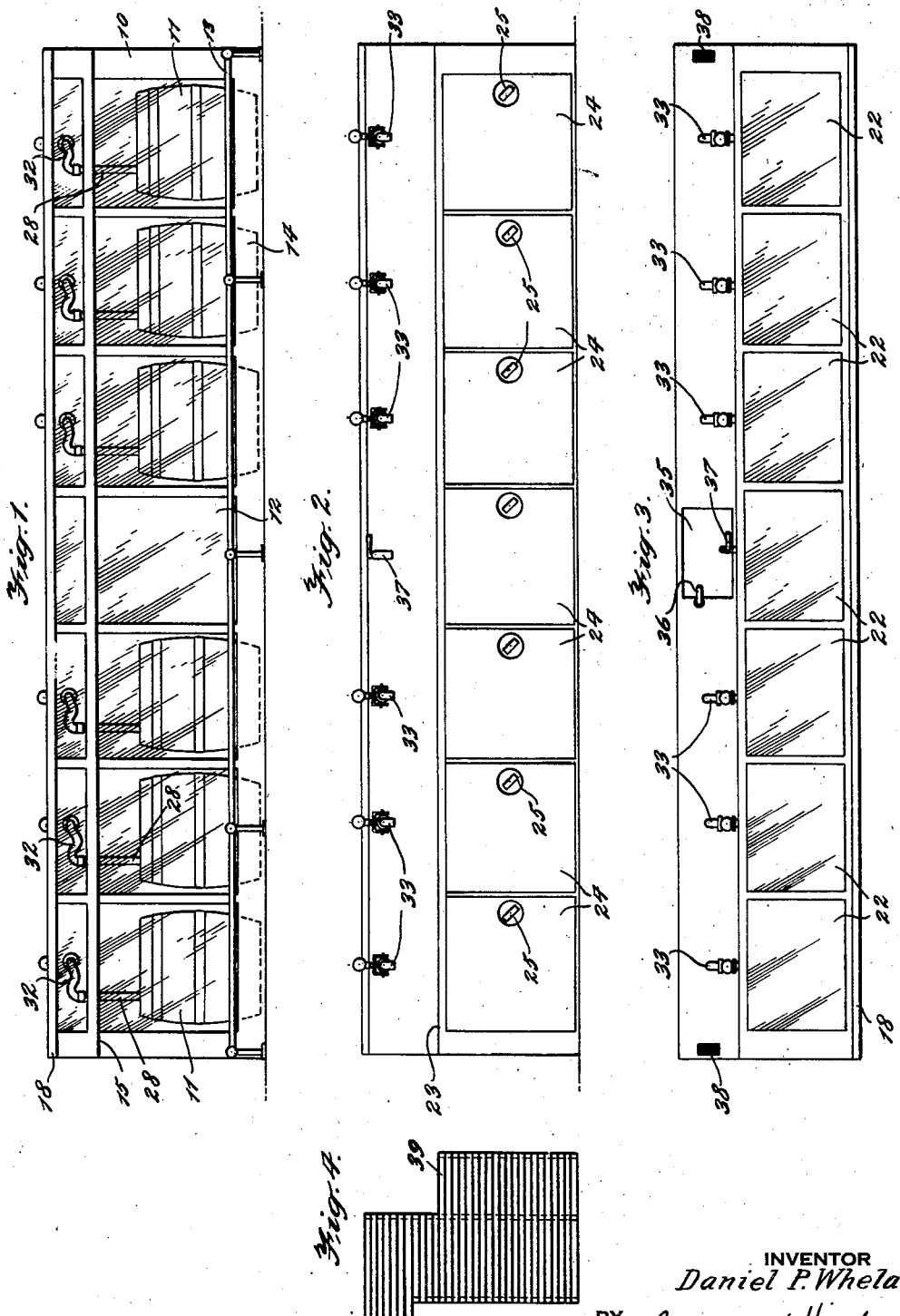
INVENTOR
Daniel P. Whelan
BY
ATTORNEYS Nov. 5, 1940.     D. P. WHELAN     2,220,503
TRANSPARENT BAR
Filed July 27, 1938     2 Sheets-Sheet 2
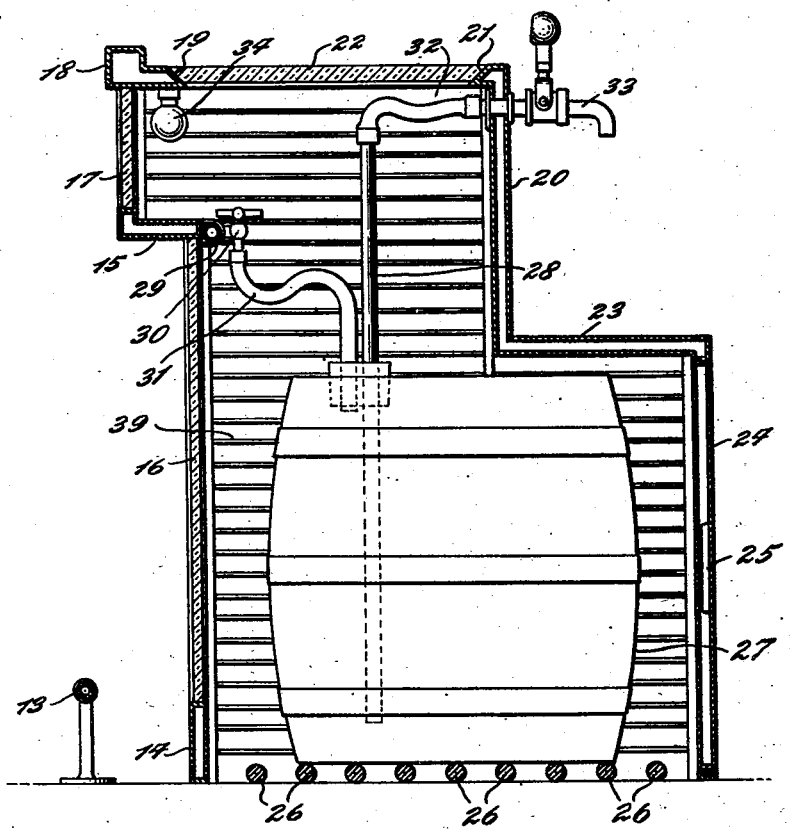
INVENTOR
Daniel P. Whelan
BY Lackenbach + Hirschman
ATTORNEYS Patented Nov. 5, 1940

2,220,503

UNITED STATES PATENT OFFICE 2,220,503

TRANSPARENT BAR

Daniel P. Whelan, Merrick, N. Y.

Application July 27, 1938, Serial No. 221,630

3 Claims. (Cl. 62—33)

The invention relates to a bar for use in restaurants and taverns for the dispensing of beverages, such as beer, from kegs or barrels, the dispensing being accomplished through taps connected to such kegs or barrels in the immediate view of the customer.

Beverages, such as beer, are ordinarily delivered to the establishment such as a restaurant or tavern, in kegs in which the beer is stored in the cellar of the establishment, from which kegs the beer is piped through a considerable length of metal coil up through the floor, to a tap near the upper surface of the bar. The cooling of the beer is conventionally effected by encasing the coils, leading from the kegs to the taps, in ice.

One of the disadvantages of the above described construction and method of dispensing beer is that the customer does not see the kegs and is usually not aware of where the beer comes from. It is a well known fact that any beverage, such as beer, is characterized by more pleasing aroma and taste, well recognized by the consumer, if it comes directly from the wood. It is therefore of great advertising value to demonstrate to the consumer, by his ability to observe directly the source of the beer that is being dispensed, as being the wooden keg in which it was confined and aged. Furthermore, the passage of beer from the keg through a considerable length of piping, necessarily of metal or other beer contaminating material, destroys the flavor and odor of the beverage to a sufficient degree to be recognized not only by the expert, but by the average consumer. The great desirability of having the beer dispensed directly from the wood, i. e. the keg, is clearly demonstrated by the present greatly advertised trend of malt liquor manufacturers, such as beer, of imparting to a metal can a lining which is claimed to have, in effect, and to be the equivalent of, the desirable properties of a conventional beer keg. A still further disadvantage of the prior methods of dispensing beer, as heretofore carried out, is that the inordinate amount of metal tubing necessary for leading the beer from the kegs in the cellar to the bar, provides an added hazard of rupture of some portion of the piping, especially by reason of the necessity of closely packing such piping by ice which must be periodically tamped down to secure effective refrigeration.

In accordance with my invention, I provide a beer dispensing bar of a structure which overcomes these primary disadvantages by constructing the bar in such manner as to have substantially all of its front and top surfaces constituted of plate glass, and to provide means for a plurality of beer kegs to be directly stored within such transparent bar in close proximity to the taps, so as to necessitate only a small and extremely short length of tubing, preferably of rubber, from the barrel or keg to the dispensing taps. In accordance with my invention, I provide also a construction in which the refrigeration of the plurality of beer kegs is attained at a minimum of cost and with the desired ultimate refrigerating effect.

Other objects of the invention and novel features of construction embodied in my structure of transparent bar will be pointed out hereinafter in conjunction with the detailed description thereof in connection with the accompanying drawings, in which a particular embodiment of my novel structure is illustrated, and in which Fig. 1 is a front view of a substantially transparent bar constructed in accordance with my invention; Fig. 2 is a rear elevation thereof; Fig. 3 is a plan view of the bar; Fig. 4 is an elevation of a series of baffle plates or louvres disposed between the various compartments of the bar; and Fig. 5 is a vertical section through one of the compartments of the composite bar.

Referring more particularly to the drawings, in which similar reference characters identify similar parts in the several views, 10 is a metal or wood frame of a length depending upon the number of compartments desired in the bar, six such compartments, with a barrel or keg 11 in each thereof being shown in the particular embodiment chosen for illustration, three of such compartments being on each side of a central compartment 12, provided for housing the refrigerant or refrigerating apparatus. Disposed in front of, and running substantially the length of the bar, is the usual foot rail 13.

As shown particularly in Fig. 5, the frame 10 is constituted of a vertical floor rail member 14 and a horizontal rail member 15, both of double thickness metal, the latter extending somewhat forward of the front surface of the bar formed of a plurality of sections of plate glass 16 positioned in front of each keg compartment. Supported upon the horizontal rail 15 are a plurality of plates of glass 17. Running throughout the upper front edge of the bar is a raised rail member 18 having the rear edge thereof beveled at 19. The rear section of the frame 10 is formed of a double thickness of sheet metal 20, the upper edge of which, facing the front of the bar, is beveled as at 21 so as to receive between it and the bevel face 19, plates of glass 22 constituting the upper or top surface of the bar. The rear portion of the frame extends from the part 20, rearwardly, to constitute a shelf 23, and then downwardly to the floor level. Each of the compartments of the bar is provided with a steel door 24 having latches 25 flush with the surfaces of the doors.

The floor of each of the compartments is provided with a series of steel rollers 26 by means of which, through the open doors 24, a keg of beer 27 may be introduced into the compartment, to the position thereof shown in Fig. 5. By removing the plate of glass 22 constituting the top surface of the bar, egress to the compartment is secured and the keg of beer may be tapped when already in the bar, a short length of pipe 28 being introduced into the bung hole of the keg in well known manner.

Along the length of the bar and supported upon the horizontal rail 15, is a compressed-air line 29 with a stop-cock 30 in each of the compartments. From such stop-cock a short line of hose 31 is passed to the piping 28, it being understood that the piping 28 is of conventional construction. To the pipe 28 is connected a short hose 32, the other end of which is connected to the usual valved tap 33 by means of which the beer from the keg is to be dispensed.

Preferably, each of the compartments is provided with one or more electric light bulbs 34.

The bar is provided with the conventional sink 35 having a cold water tap 36 and an iced drinking water tap 37. Near each end of the bar is a drain 38.

The various compartments are separated, in the preferred embodiment of my invention, which, however, is shown for purposes of illustration and not by way of limitation, by a structure illustrated in Figs. 4 and 5 and constituting a series of baffles or louvres of metal, the louvres 39 being so arranged as to be adapted to be closed or opened in the manner of a Venetian blind. This vertical set of baffles or louvres, between adjacent compartments, may be utilized to direct streams of cold air from the central refrigerating compartment 12 over the kegs of beer housed in the various compartments. The use of the vertical series of louvres makes possible not only the control of the flow of cold air over the kegs in a desired manner, but makes possible the use of only a part of the compartments, for instance, only two or four of the six shown in the illustrated embodiment, by completely closing some of the louvres, so as to retain the cold circulating air in only such compartments as contain kegs of beer. Thus, while I have shown my novel construction of bar as constituted of six compartments, any number of such compartments may be built in the same bar and only so many, nearest the central refrigerating compartment, used as may be deemed necessary. For instance, during the winter months, when the consumption of beer is much less than in the summer, the same bar may be effectively used by merely shutting off certain of the end compartments in which no kegs are positioned. The amount of refrigerant or refrigerating medium thus necessary may be conveniently controlled with respect to the number of kegs of beer used in the bar.

From the above, it will be clear, that the particular embodiment of my inventive structure illustrated in the drawings and described hereinabove, is merely by way of example and that my invention may be utilized in a beverage dispensing bar having elements different in number, differently disposed, and of a different configuration than that specifically shown and described, without departing from my invention.

I claim:

1. A bar for the storage and displaying of a plurality of kegs of a beverage, such as beer, and for dispensing said beverage directly from such kegs, comprising an elongated frame divided into a plurality of compartments including a central refrigerating compartment and a plurality of compartments on each side thereof adapted to receive and to contain wholly therein, a plurality of kegs of the beverage, said bar being constituted substantially throughout its front and top surfaces of plates of glass, whereby a customer standing in front of the bar, may view the plurality of kegs within the bar, the compartments of the bar being separated by a set of vertical baffles or louvres adapted to be closed or opened for the control of the passage of cold air from the refrigerating compartment to the compartments housing the various kegs, said baffles or louvres being constituted of slats movable from fully open to fully closed position and capable of being stopped at any intermediate position at the will of the operator.

2. A bar for the storage and displaying of a plurality of kegs of a beverage, such as beer, and for dispensing said beverage directly from such kegs, comprising an elongated frame divided into a plurality of compartments including a central refrigerating compartment and a plurality of compartments on each side thereof adapted to receive and contain wholly therein, a plurality of kegs of the beverage, said bar being constituted substantially throughout its front and top surfaces of plates of glass, whereby a customer standing in front of the bar, may view the plurality of kegs within the bar, the compartments of the bar being separated by a set of vertical baffles or louvres adapted to be closed for shutting off the passage of cold air from the refrigerating compartment to any of the compartments housing the various kegs, said baffles or louvres being constituted of slats movable from fully open to fully closed position and capable of being stopped at any intermediate position at the will of the operator.

3. A bar for the storage and displaying of a plurality of kegs of a beverage, such as beer, and for dispensing said beverage directly from such kegs, comprising an elongated frame divided into a plurality of compartments including a central refrigerating compartment and a plurality of compartments on each side thereof adapted to receive and to contain wholly therein, kegs of the beverage, said bar being characterized by being constituted substantially throughout its front face and top surface by plates of glass, whereby a consumer standing in front of the bar may view the plurality of kegs within the bar, each of said compartments having a plurality of steel rollers disposed upon the floor thereof for the ready introduction into the bar of the kegs, a plurality of dispensing taps disposed near the top surface of the bar and extending from each compartment, rearwardly, from the bar, and short lengths of rubber tubing extending from said taps into said compartments for connection to the discharge pipe of each keg, the compartments of the bar being separated by a set of vertical baffles or louvres adapted to be closed or opened for the control of the passage of cold air from the refrigerating compartment to the compartments housing the various kegs, said baffles or louvres being constituted of slats movable from fully open to fully closed position and capable of being stopped at any intermediate position at the will of the operator.

DANIEL P. WHELAN.